(12) United States Patent
Krishnamurthy et al.

(10) Patent No.: US 8,441,241 B2
(45) Date of Patent: May 14, 2013

(54) METHODS AND SYSTEMS TO DIGITALLY BALANCE CURRENTS OF A MULTI-PHASE VOLTAGE REGULATOR

(75) Inventors: Harish K. Krishnamurthy, Hillsboro, OR (US); Annabelle Pratt, Hillsboro, OR (US); Gene Frederiksen, Hillsboro, OR (US); Krishnan Ravichandran, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 428 days.

(21) Appl. No.: 12/772,366

(22) Filed: May 3, 2010

(65) Prior Publication Data

US 2011/0267019 A1 Nov. 3, 2011

(51) Int. Cl.
*G05F 1/40* (2006.01)
(52) U.S. Cl.
USPC .......................................... 323/272; 323/282
(58) Field of Classification Search .................. 323/266, 323/272, 273, 279–282
See application file for complete search history.

(56) References Cited

U.S. PATENT DOCUMENTS

| | | | | |
|---|---|---|---|---|
| 6,979,984 B2 * | 12/2005 | Perrier et al. | ................. | 323/281 |
| 7,570,035 B2 * | 8/2009 | Kleveland | ..................... | 323/276 |
| 7,944,248 B2 * | 5/2011 | Nguyen et al. | ................... | 327/73 |
| 8,169,205 B2 * | 5/2012 | Chen et al. | ..................... | 323/282 |
| 2010/0315844 A1 | 12/2010 | Portisch | | |

OTHER PUBLICATIONS

United Kingdom Search Report received for GB Patent Application No. 1106582.8, mailed on Oct. 19, 2011, 4 pages.

* cited by examiner

*Primary Examiner* — Adolf Berhane
(74) *Attorney, Agent, or Firm* — Garrett IP, LLC

(57) ABSTRACT

Methods and systems to generate a digital error indication of an input signal relative to a reference signal, using resistors, comparators, and latches. The digital error indication may indicate that the input signal is within a range of the reference signal, above the range, or below the range. The methods and systems may be implemented within a multi-phase digital voltage regulator to generate a digital error indication for each of a plurality of phase currents relative to an instantaneous average of the phase currents. The digital voltage regulator may be fabricated on an integrated circuit die with a corresponding load, such as a processor. The digital voltage regulator may include a plurality of multiplier or look-up based gain modules, each to receive a corresponding one of the digital error signals and to output one of three values. Outputs of each gain module may be integrated over time.

19 Claims, 10 Drawing Sheets

400 ⟶

| Conditions 402 (for y = 5%) | | 102 | | Indications 404 |
|---|---|---|---|---|
| | | H1 | H2 | |
| Case 1 | $0.95(v_{in}) < 0.9(v_{ref})$ | 0 | 0 | $v_{in} < 0.95(v_{ref})$<br>($V_{in}$ is below lower limit 206) |
| Case 2 | $0.9(v_{ref}) < 0.95(v_{in}) < v_{ref}$ | 1 | 0 | $0.95(v_{ref}) < v_{in} < 1.05(v_{ref})$<br>($V_{in}$ is within upper and lower limits 204 and 206) |
| Case 3 | $0.95(v_{in}) > v_{ref}$ | 1 | 1 | $v_{in} > 1.05(v_{ref})$<br>($V_{in}$ is above upper limit 204) |

US 8,441,241 B2

METHODS AND SYSTEMS TO DIGITALLY BALANCE CURRENTS OF A MULTI-PHASE VOLTAGE REGULATOR

BACKGROUND

A power supply may include multiple power transistors to generate a plurality of phase currents, inductors to conduct the phase currents, and a summing node where an output voltage is established.

Mismatches in duty cycles of the power transistors, resistances of the inductors, operating characteristics of the power transistors, and/or board traces, may result in phase current imbalances, which may lead to saturation of the inductors.

A power supply may include an analog or digital regulator to control the duty cycles to balance the phase currents with respect to one another.

Conventional digital voltage regulators include per-phase analog-to-digital converters (ADCs) to digitize measured phase currents. Outputs of the ADCs may be combined to generate digital indications of a total current and a per-phase average phase current. Per-phase digital error indications may be determined as a difference between the per-phase average phase current and corresponding ADC outputs. The digital error indications and the digital indications of the total current may be provided to a control system to regulate the duty cycles.

Since the digital indication of the total current is obtained from ADC samples of the phase currents, if the power supply is subjected to a step load, the total current indication may not be updated until a subsequent ADC sample cycle, which may correspond to a subsequent duty cycle. As a result, subsequent processes that utilize the total current indication may have delayed responses to transients. In addition, per-phase ADCs consume relatively significant amounts of area and power.

BRIEF DESCRIPTION OF THE DRAWINGS/FIGURES

Figure 1:
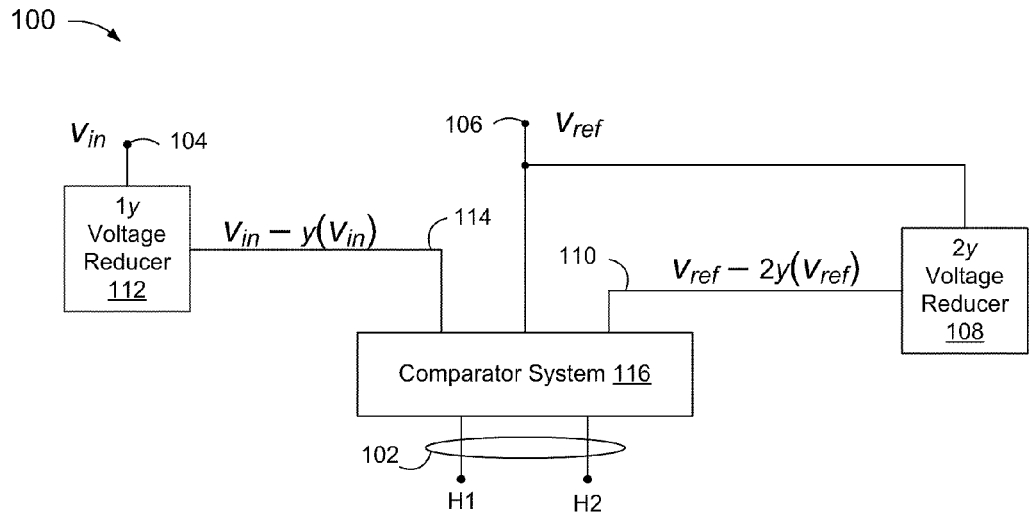
FIG. 1 is a block diagram of a system, including voltage reducers and a comparator system to generate a digital error indication of an amplitude of an input signal relative to an amplitude range.

In the drawings, the leftmost digit(s) of a reference number identifies the drawing in which the reference number first appears.

DETAILED DESCRIPTION

FIG. 1 is a block diagram of a system 100 to generate a digital indication 102 of a level or amplitude of an analog input signal 104 relative to a range associated with a level or amplitude of an analog reference signal 106.

Digital indication 102 may represent a difference or error between input signal 104 and reference signal 106, and system 100 may be implemented as part of a digital control system to adjust input signal 104 in relation to reference signal 106, based on digital error indication 102.

The levels or amplitudes of input signal 104 and reference signal 106 may correspond to voltages, and input signal 104 and reference signal 106 may be referred to herein as input voltage 104 and reference voltage 106, respectively. Similarly, signals derived from input 104 and/or reference signal 106 may be referred to herein as voltages. Methods and systems disclosed herein are not, however, limited to signal voltages.

The range may correspond to a tolerance range within which input signal 104 is to be maintained. For example, where the amplitude of input signal 104 corresponds to a voltage, the range may be defined as a voltage of reference signal 106±a percentage.

Figure 2:
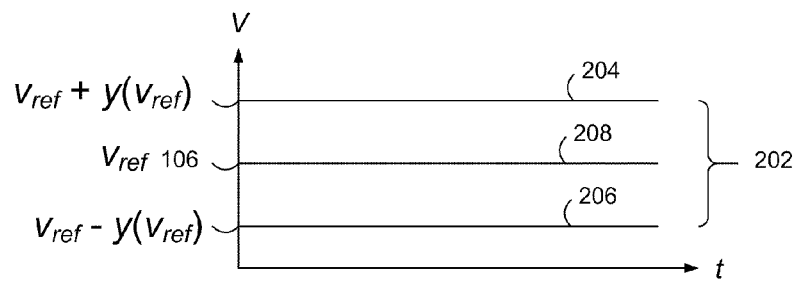
FIG. 2 is a graphic depiction of an amplitude range substantially equal to an amplitude of a reference signal plus and minus a percentage.

FIG. 2 is a graphic depiction of a range 202 having an upper limit 204 and a lower limit 206. Upper limit 204 may correspond to, for example and without limitation, approximately 105% of reference voltage 106. Lower limit 206 may correspond to, for example and without limitation, approximately 95% of reference voltage 106. A mid-point 208 of range 202 may correspond to reference voltage 106.

Input signal 104 may be compared directly to upper and lower limits 204 and 206, such as with an operational amplifier (OpAmp) to generate upper limit 204, and a resistor divider to generate lower limit 206.

Alternatively, a reduced amplitude of input signal 104 may be compared to correspondingly reduced amplitudes of upper and lower limits 204 and 206 to obtain a relative indication of input signal 104 with respect to range 202. The reduced amplitudes of input signal 104 and upper and lower limits 204 and 206 may be generated with resistive circuits, which may consume less area and power than an OpAmp implementation.

In FIG. 1, system 100 includes a first voltage reducer 112 to reduce input voltage 104 to a reduced input voltage 114, and a second voltage reducer 108 to reduce reference voltage 106 to a reduced reference voltage 110.

Second voltage reducer 108 may be configured to reduce reference voltage 106 by two times a percentage, illustrated here as y. Where reference signal 106 is denoted $v_{ref}$, reduced reference voltage 110 may be represented as $v_{ref} - 2y(v_{ref})$.

Figure 3:
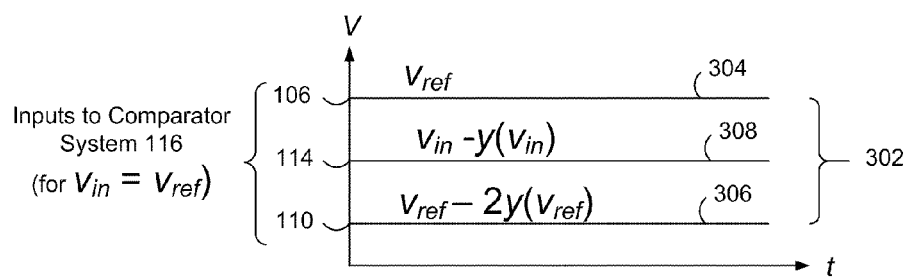
FIG. 3 is a graphic depiction of another amplitude range, having an upper limit of the reference signal of FIG. 2 and a lower limit approximately equal to the reference signal minus twice the percentage.

FIG. 3 is a graphic depiction of a range 302, having an upper limit 304 corresponding to reference voltage 106, and a lower limit 306 corresponding to reduced reference voltage 110. A span of range 302 in FIG. 3 may be substantially equal to a span of range 202 in FIG. 2.

Alternatively, system 100 may be configured to position range 302 below the reference voltage 106. For example, system 100 may include another voltage reducer to reduce reference voltage 106 to position upper limit 304 below reference voltage 106.

In FIG. 1, first voltage reducer 112 may be configured to reduce input voltage 104 by the percentage y. Where input signal 104 is denoted $v_{in}$, reduced input voltage 114 may be represented as $v_{in} - 2y(v_{in})$.

When input voltage 104 is substantially equal to reference voltage 106 in FIG. 1, reduced input voltage 114 may be represented in FIG. 3 at a midpoint 308 between upper and lower limits 304 and 306.

In the example of FIG. 3, voltages are illustrated as substantially constant over a time period. One or more of the voltages may, however, vary over time, such as described in one or more examples below.

In FIG. 1, system 100 further includes a comparator system 116 to generate digital indication 102.

Comparator system 116 may be configured to generate digital indication 102 to indicate an amplitude of reduced input signal 114 relative to range 302 in FIG. 3, which may relate to an amplitude of input signal 104 relative to range 202 in FIG. 2.

Comparator system 116 may be configured, for example, to output one of three digital indications or codes to indicate that input signal 104 is within range 202, above upper limit 204, or below lower limit 206. Alternatively, comparator system 116 may be configured to generate digital indication 102 with higher or lower resolution.

The percentage y may be, for example, and without limitation, approximately 5%, to establish upper and range lower limits of approximately ±5% around reduced reference signal 110 (i.e. 0.9/0.95=94.74% and 1.0/0.95=105.26%).

Examples are provided below with reference to FIGS. 4 and 5 for y=5%. Methods and systems disclosed herein are not, however, limited to the examples of FIGS. 4 and 5.

Figures 4, 5:
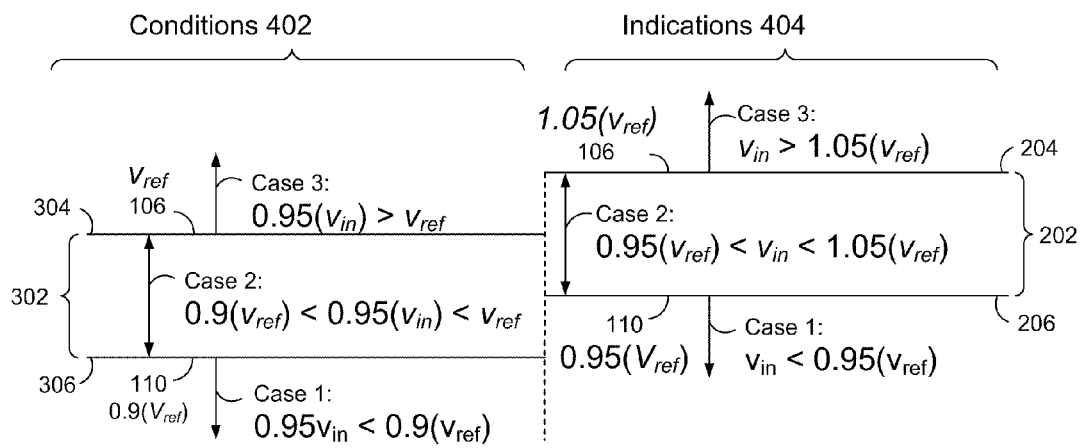
FIG. 4 is a table of example conditions of the input signal relative to the range, and corresponding digital error indications.
FIG. 5 is a graphic depiction of the example conditions and indications of FIG. 4.

FIG. 4 is a table 400 of example conditions 402, which may correspond to inputs to comparator system 116, such as illustrated in FIG. 3. Table 400 further includes corresponding example bit values H1 and H2 of digital indication 102, and indications 404, which relate conditions 402 to conditions of FIG. 2.

FIG. 5 is a graphic depiction of conditions 402 and indications 404.

Conditions 402 include cases 1, 2, and 3.

For case 1, reduced input voltage 114 is less than reduced reference voltage 110, $(0.95(v_{in}) < 0.9(v_{ref}))$. Under the corresponding indication 404, input voltage 104 is below lower limit 206 $(v_{in} < 0.95(v_{ref}))$.

For case 2, reduced input voltage 114 is between reduced reference voltage 110 and reference voltage 106, $(0.9(v_{ref}) < 0.95(v_{in}) < v_{ref})$. Under the corresponding indication 404, input voltage 104 is between lower limit 206 and upper limit 204 $(0.95(v_{ref}) < v_{in} < 1.05(v_{ref}))$.

For case 3, reduced input voltage 114 is greater than reference voltage 106, $(0.95(v_{in}) > v_{ref})$. Under the corresponding indication 404, input voltage 104 is above upper limit 204 $(v_{in} > 1.05(v_{ref}))$.

Figure 6:
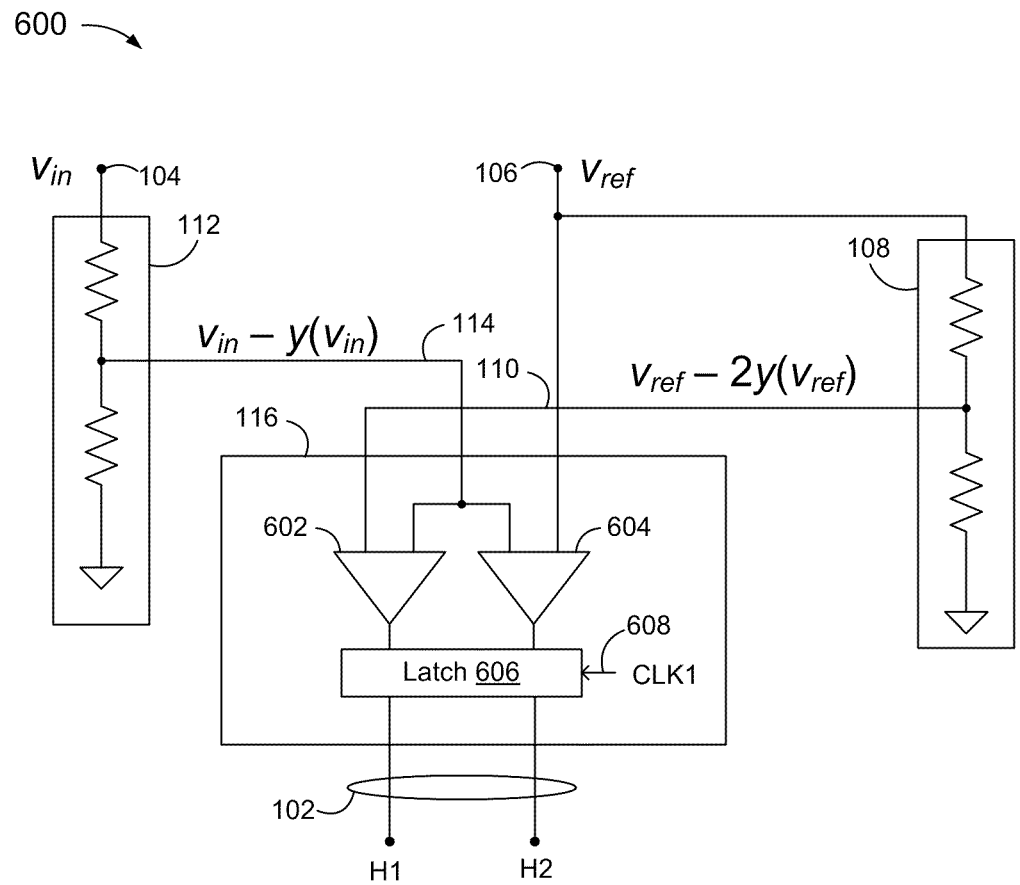
FIG. 6 is a block diagram of another system, wherein the voltage reducers of FIG. 1 include resistor divider circuits, and wherein the comparator system of FIG. 1 includes first and second comparators and a latch.

FIG. 6 is a block diagram of a system 600, wherein first and second voltage reducers 112 and 108 of FIG. 1 include resistor divider circuits, and wherein comparator system 116 includes first and second comparators 602 and 604, respectively, and a latch 606.

First comparator 602 may be configured to compare reduced reference voltage 110 to reduced input voltage 114. First comparator 602 may be further configured to generate a relatively high voltage output when reduced input voltage 114 is greater than reduced reference voltage 110, and to generate a relatively low voltage output when reduced input voltage 114 is less than reduced reference voltage 110, such as illustrated by H1 in FIG. 4.

Second comparator 604 may be configured to compare reduced input voltage 114 to reference voltage 106. Second comparator 604 may be further configured to generate a relatively low voltage output when reduced input voltage 114 is less than reference voltage 106, and to generate a relatively high voltage output when reduced input voltage 114 is greater than reference voltage 106, such as illustrated by H2 in FIG. 4.

Latch 606 may be configured to latch outputs of comparators 602 and 604 in response to a clock signal 608, and to output the latched values as digital error indication 102.

Latch 606 essentially digitizes the result of the comparison with a two bit sampling operation, as opposed to digitizing a full range of input signal 104 and reference signal 106 with corresponding ADCs and comparing outputs of the ADCs. As described below with respect to FIGS. 7 and 8, where multiple input signals are compared to a reference signal or reference range, such a digitization technique may provide fairly significant savings in terms of area and power consumption relative to a per-phase ADC system.

In examples above, voltage reducer 112 is configured to reduce input voltage 104 by a percentage and voltage reducer 108 is configured to reduce reference voltage 106 by twice the percentage. Methods and systems disclosed herein are not, however, limited to such examples.

Figure 7:
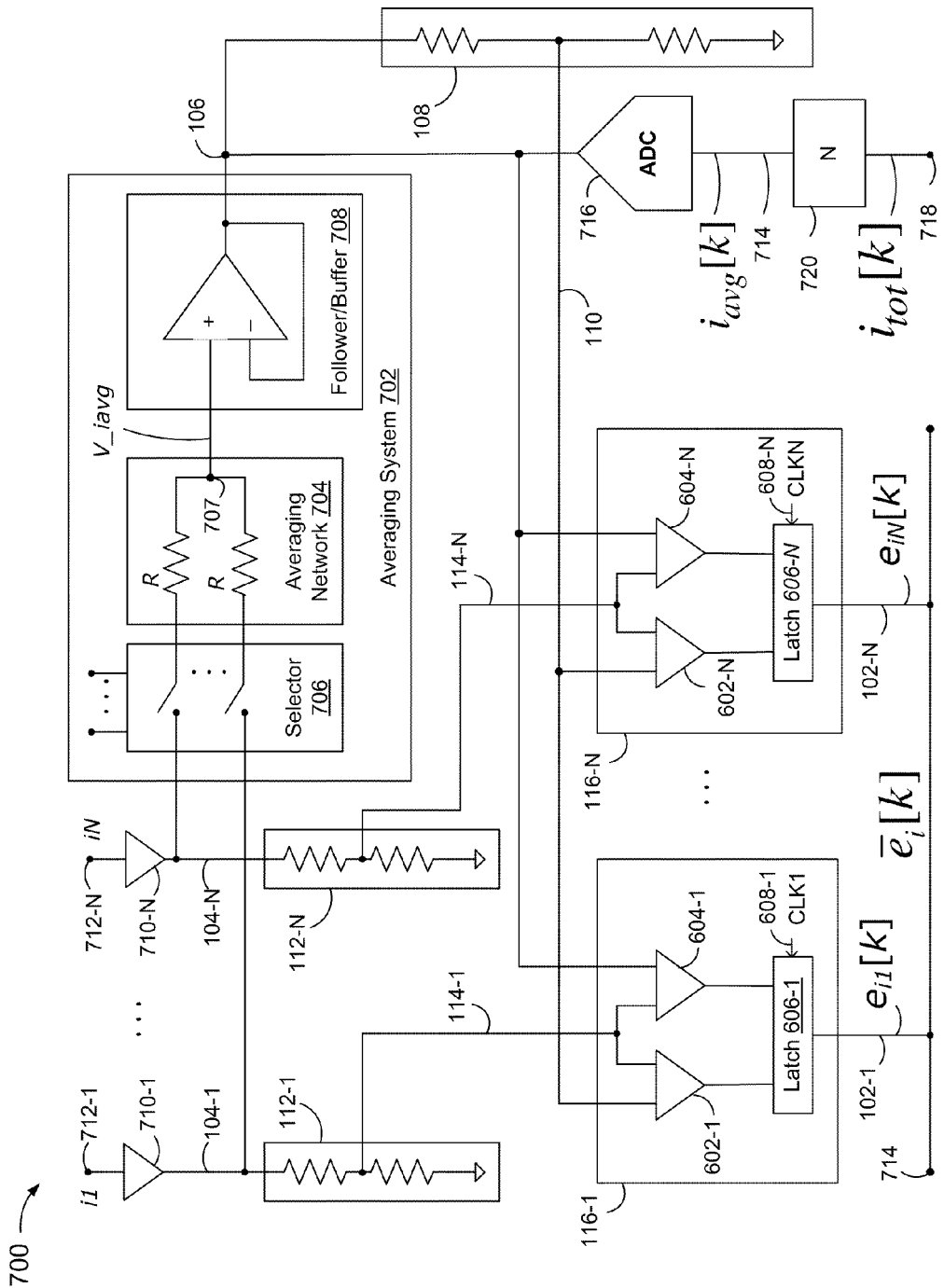
FIG. 7 is a block diagram of a system to generate digital error indications for each of a plurality of input voltages relative to a range substantially equal to an instantaneous average of the plurality of input voltages plus and minus a percentage.

FIG. 7 is a block diagram of a system 700 to generate a plurality of digital error indications 102-1 through 102-N, each indicative of an amplitude of a corresponding one of input signals 104-1 through 104-N relative to a range about an instantaneous average of the amplitudes of input signals 104-1 through 104-N.

Amplitudes of input signals 104-1 through 104-N may correspond to voltages, and system 700 may include an averaging system 702 to generate reference signal 106 as an instantaneous average of input voltages 104-1 through 104-N. With respect to FIG. 7, reference signal 106 may be referred to as an instantaneous per-phase average voltage 106.

Averaging system 702 may include a resistor network 704, including a plurality of resistors in parallel with one another, each having a resistance R. Each resistor R is coupled to a corresponding one of input voltages 104-1 through 104-N and to a node 707 to provide an average of input voltages 104-1 through 104-N at node 707.

Sources of input voltages 104-1 through 104-N may be controllable, such that one or more of the sources may be disabled from time to time. Averaging system 702 may include a selector 706 to selectively disconnect one or more input voltages 104-1 through 104-N from averaging network 704 when a corresponding source is disabled. This may help to ensure that node 107 accurately represents the instantaneous per-phase average voltage.

Averaging system 702 may include a follower or buffer 708 to reproduce the instantaneous per-phase average voltage of node 707 as reference voltage 106, and to substantially isolate or protect input voltages 104-1 through 104-N from downstream processes performed with respect to instantaneous per-phase average voltage 106.

System 700 further includes second voltage reducer 108 to generate reduced reference signal 110 from instantaneous per-phase average voltage 106.

System 700 further includes N first voltage reducers 112-1 through 112-N, each to receive a corresponding one of input voltages 104-1 through 104-N, and to generate a corresponding one of reduced input voltages 114-1 through 114-N.

System 700 further includes N comparator systems 116-1 through 116-N, each to receive a corresponding one of reduced input voltages 114-1 through 114-N, instantaneous per-phase average voltage 106, and reduced reference voltage 110, and to generate a corresponding one of digital error indications 102-1 through 102-N, such as described above.

Digital indications 102-1 through 102-N may be represented as errors $e_{i1}[k]$ through $e_{iN}[k]$, and may be output as $\bar{e}_i[k]$ to a bus 714.

Sources of input voltages 104-1 through 104-N may include phase currents 712-1 through 712-N, such as described below with respect to FIG. 8. System 700 may include current sensors 710-1 through 710-N to generate input voltages 104-1 through 104-N from phase currents 712-1 through 712-N. In such a situation, instantaneous per-phase average voltage 106 may represent an instantaneous per-phase average of phase currents 712-1 through 712-N.

System 700 may be configured to generate a digital indication $i_{avg}[k]$ 714 of an instantaneous per-phase average phase current. For example, system 700 may include an ADC 716 to generate digital indication $i_{avg}[k]$ 714 from instantaneous per-phase average voltage 106.

System 700 may be configured to generate a digital indication $i_{tot}[k]$ 718 corresponding to a sum or total of phase currents 712-1 through 712-N. For example, system 700 may include a digital multiplier 720 to multiply digital indication $i_{avg}[k]$ by the number of active phase currents 712-1 through 712-N.

One or more of digital error indications $\bar{e}_i[k]$, $i_{avg}[k]$, and $i_{tot}[k]$ may be output to a digital controller, such as to control input voltages 104-1 through 104-N, and/or phase currents 712-1 through 712-N. For example, phase currents 712-1 through 712-N may correspond to phase currents of a multi-phase power supply, and system 700 may be implemented to provide digital inputs to a digital control system, which may include a phase balance system to balance currents 712-1 through 712-N in response to digital indications or errors $\bar{e}_i[k]$. The digital control system may further include an adaptive voltage positioning (AVP) system and/or a phase shedding system to receive digital indication $i_{tot}[k]$, to control an output voltage level and/or a number of active phases.

Figure 8:
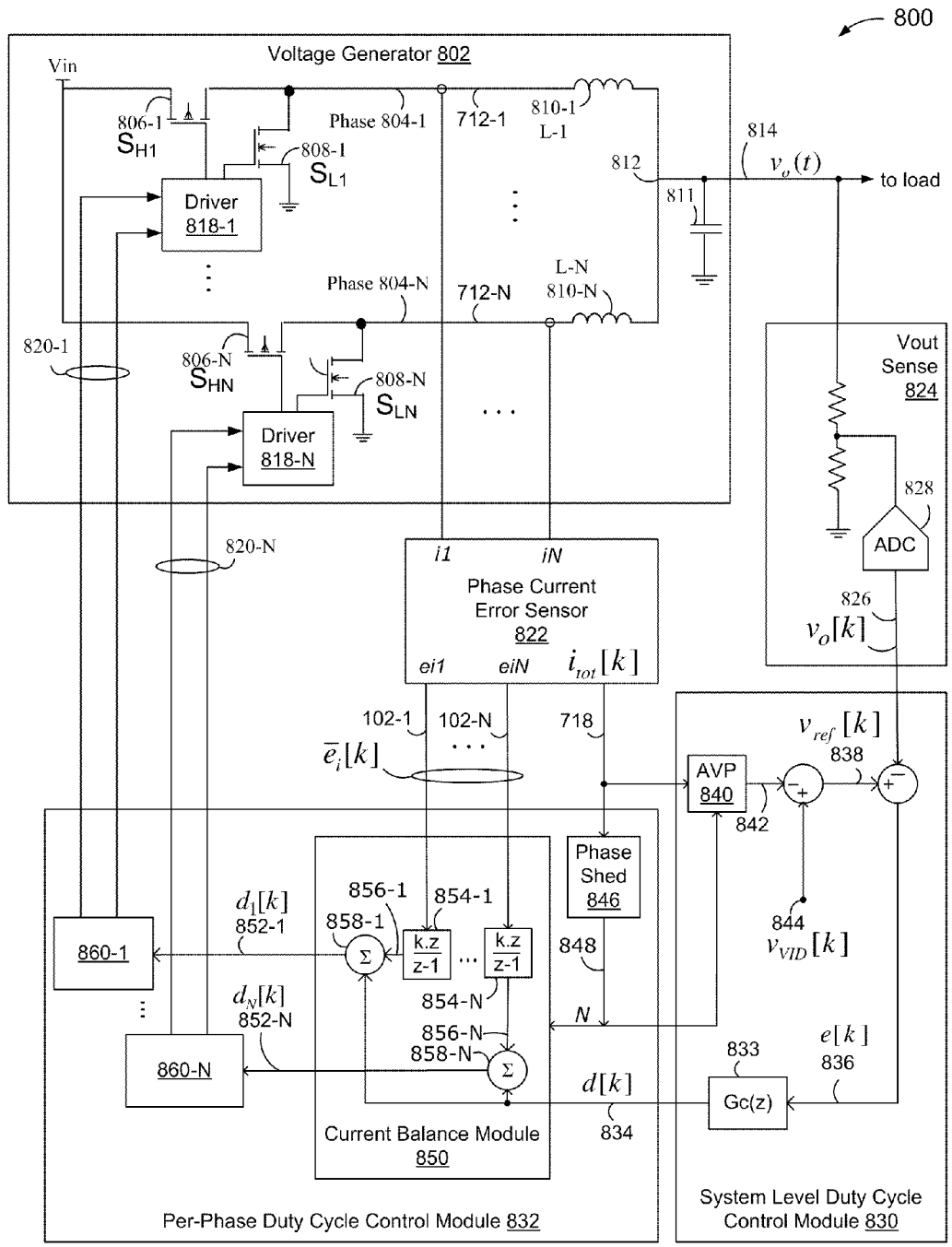
FIG. 8 is a block diagram of a digitally controlled multi-phase voltage regulator.

FIG. 8 is a block diagram of a power supply system 800, including a multiple-phase voltage regulator 802, having a plurality of phase paths 804-1 through 804-N.

Each phase path 804-1 through 804-N includes a corresponding one of high-side power transistors 806-1 through 806-N ($S_{H1}$ through $S_{HN}$), and a corresponding one of low-side power transistors 808-1 through 808-N ($S_{L1}$ through $S_{LN}$), to generate respective phase currents 712-1 through 712-N.

Each phase path 804-1 through 804-N further includes a corresponding one of inductors 810-1 through 810-N (L-1 through L-N) to conduct the respective phase currents 712-1 through 712-N to a summing node 812, where an output voltage ($v_0(t)$) 814 is established. Output voltage ($v_0(t)$) 814 may be provided to a load, such as disclosed below with respect to FIG. 12.

Voltage regulator 802 may include a capacitor 811 to smooth ripples of output voltage ($v_0(t)$) 814.

Each phase path 804-1 through 804-N further includes a corresponding one of drivers 818-1 though 818-N, each to control the corresponding high-side transistor $S_{Hi}$ and low-side power transistors $S_{Li}$ in response to a duty cycle defined by a corresponding set of control signals 820-1 through 820-N.

System 800 furthers includes a phase current error system 822 to determine imbalances of phase currents 712-1 through 712-N. Phase current error system 822 may include system 700 of FIG. 7 to output digital error indications $\bar{e}_i[k]=[e_{i1} \ldots e_{iN}]$ 102-1 through 102-N and digital indication $i_{tot}[k]$ 718, such as described above with respect to FIG. 7.

System 800 may further include a voltage sense circuit 824 to generate a digital indication $v_o[k]$ 826 of output voltage 814. Voltage sense circuit 824 may include an ADC 828 to generate digital indication $v_o[k]$.

System 800 may further include a system level duty cycle control module 830 to control a voltage level of output voltage $v_o(t)$ 814, and a per-phase duty cycle control module 832 to control individual duty cycles of transistors 806-1 through 806-N and 808-1 through 808-N.

System level duty cycle control module 830 may include a compensator Gc(z) 833 to generate a system level duty cycle factor or command d[k] 834 in response to an error signal e[k] 836. Error signal e[k] 836 may represent a difference between $v_o[k]$ and a digital reference signal $v_{ref}[k]$ 838.

System level duty cycle control module 830 may include an adaptive voltage positioning (AVP) system 840 to generate a load line term 842. Reference signal $v_{ref}[k]$ may correspond to a difference between load line term 842 and a voltage identification (VID) code $v_{VID}[k]$ 844.

VID code $v_{VID}[k]$ may represent a voltage requirement of the load, which may include a processor, such as disclosed below with respect to FIG. 12. For example, the processor may be configured to operate at one of multiple power levels, which may be varied to adjust a performance level of the processor.

Load line term 842 may represent an adjustment factor to adjust VID code $v_{VID}[k]$ in response to the total average current $i_{tot}[k]$ 718 and in response to an indication 848 of a number of active phase paths 804-1 through 804-N.

Per-phase duty cycle control module 832 may include a phase shed module 846 to receive digital indication $i_{tot}[k]$, and to selectively enable and disable one or more of phase paths 804-1 though 804-N. This is referred to herein as phase shedding. Phase shed module 846 may be configured to output indication 848 of the number of phase paths 804-1 through 804-N to be active.

Per-phase duty cycle control module 832 may include a current balance module 850 to determine per-phase duty cycle factors $d_1[k]$ through $d_N[k]$ 852-1 through 852-N for corresponding phase paths 804-1 through 804-N. Current balance module 850 may be configured to determine duty cycle factors $d_1[k]$ through $d_N[k]$ to substantially balance currents 712-1 through 712-N with respect to one another.

Current balance module 850 may be configured to determine duty cycle factors $d_1[k]$ through $d_N[k]$ in response to system level duty cycle factor $d[K]$ 834 and phase current errors $\bar{e}_i[k]$. Where indication 848 indicates that one or more of phase paths 804-1 through 804-N are to be disabled, current balance module 850 may be configured to set a corresponding one of duty cycle factors $d_1[k]$ through $d_N[k]$ to zero.

Current balance module 850 may be configured to implement relatively complex and/or adaptive current balancing algorithms to balance phase currents 718-1 through 718-N.

Alternatively, where phase current error sensor 822 includes a comparator-based system, such as system 700 in FIG. 7, current balance module 850 may be configured to balance currents using integrator based per-phase duty cycle modules 854-1 through 854-N, such as described below with respect to FIG. 9.

Figure 9:
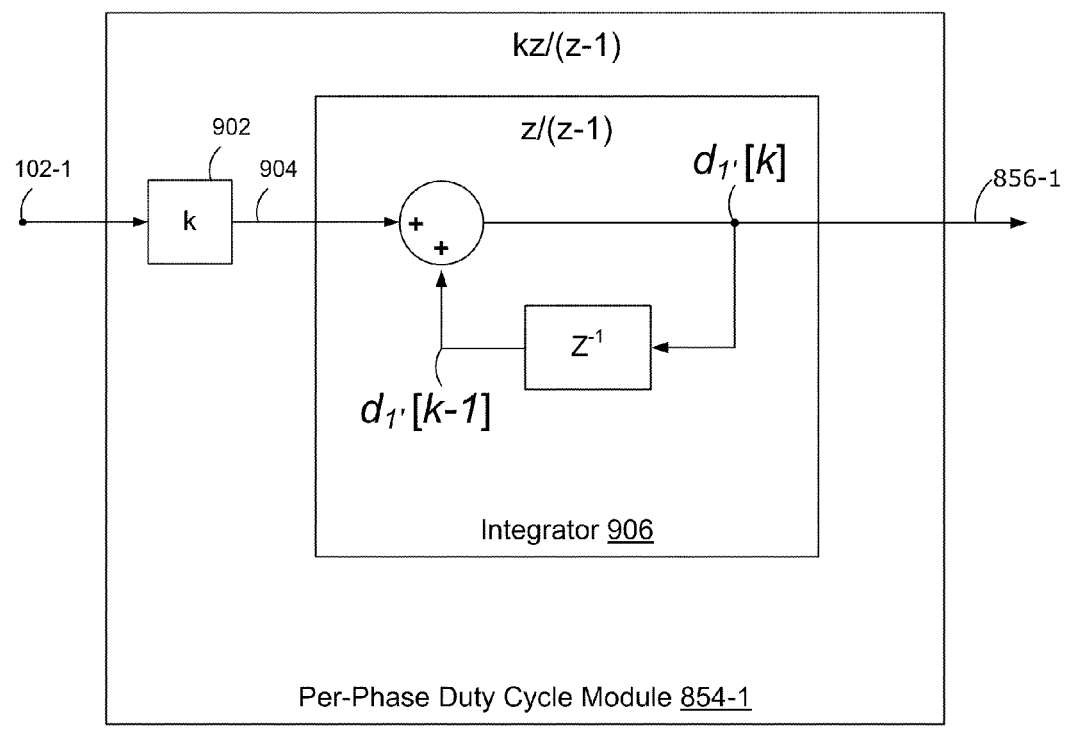
FIG. 9 is an example block diagram of a per-phase duty cycle control module of FIG. 8.

FIG. 9 is an example block diagram of per-phase duty cycle module 854-1, including a gain module 902 to apply a gain k to a value of error indication 102-1. Gain value k may be controllable. Module 854-1 further includes an integrator 906 to integrate an output 904 of gain module 902 over time, and to output a resultant duty cycle adjustment indication 856-1. Integrator 906 may be configured to implement a transfer function $z/(z-1)$. Module 854-1 may be configured to implement a transfer function $kz/(z-1)$.

Gain module 902 may include a multiplier to multiply a value of error indication 102-1 by k. Alternatively gain module 902 may be configured to look-up a value to output at 904 based upon a value of error indication 102-1.

Error indication 102-1 may be decoded, and gain module 902 may be configured to multiply the decoded value by k. Alternatively, the decoded value may be used to look-up a value to output at 904.

For example, and without limitation, error indication 102-1 may include three potential states, "00" to indicate that phase current 712-1 is too low, "10" to indicate that phase current 712-1 is within range, "11" to indicate that phase current 712-1 is too high, such as illustrated in FIG. 4. Error indication 102-1 may be decoded as a negative 1 when phase current 712-1 is too low, as zero when phase current 712-1 is within range, and as positive 1 when phase current 712-1 is too high.

Gain module 902 may be configured to multiply the values −1, 0, or +1 by k.

Alternatively, gain module 902 may be configured to look-up a value to output at 904 based on error indication 102-1, such as illustrated in table 1 below, where k=3. Gain module 902 is not, however, limited to k=3.

TABLE 1

| Error Indication 102-1 | Decoded Value | Output 904 (e.g., for K = 3) |
| --- | --- | --- |
| 00 | −1 | −3 |
| 10 | 0 | 0 |
| 11 | +1 | +3 |

In FIG. 8, current balance module 850 may include adders 858-1 through 858-N, each to add a corresponding one of duty cycle adjustment indications 856-1 through 856-N and duty cycle command $d[k]$ 834, and to output a corresponding one of duty cycle factors $d_1[k]$ through $d_N[k]$ 852-1 through 852-N.

Per-phase duty cycle control module 832 may include duty cycle waveform generators 860-1 through 860-N to generate corresponding duty cycle control signals 820-1 through 820-N from corresponding duty cycle factors $d_1[k]$ through $d_N[k]$.

Phase current error sensor 822 may be configured to perform mid-point sampling, such as described below with respect to FIGS. 10 and 11.

Figure 10:
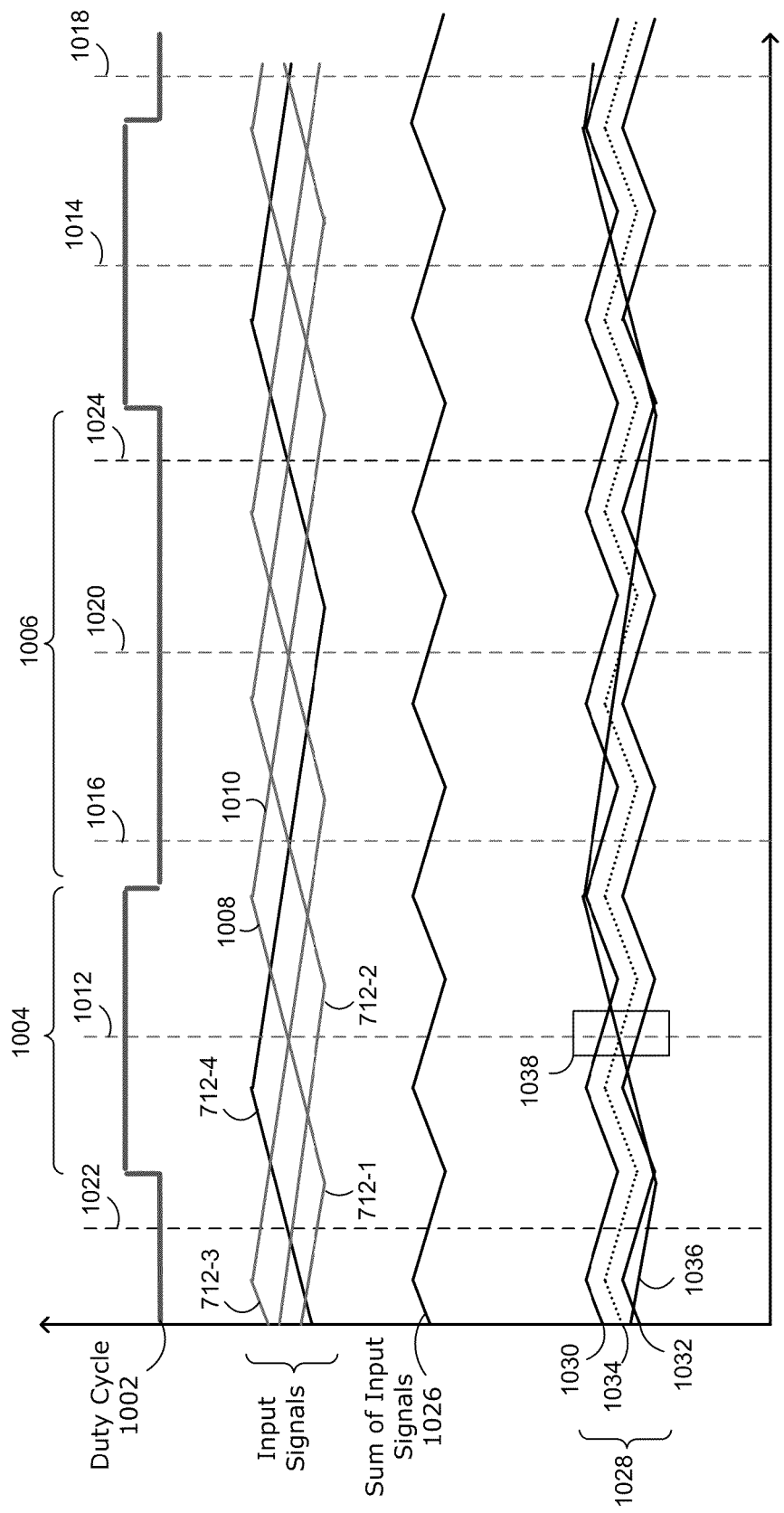
FIG. 10 is an example timing diagram.

FIG. 10 is an example timing diagram 1000, including phase currents 712-1 through 712-4, or voltages indicative thereof, each of which includes rising portions that correspond to on-times of respective high-side power transistors 806-1 through 806-4, and falling portions that correspond to on-times of respective low-side power transistors 808-1 through 808-4.

For example, a duty cycle 1002 may correspond to duty cycle control signals 820-1 in FIG. 8, to control phase current 712-1. Duty cycle 1002 includes a relative high portion 1004, which may correspond to an on-time of high-side power transistor 806-1 in FIG. 8, and a relatively low portion 1006, which may correspond to an on-time of low-side power transistor 808-1 in FIG. 8.

In FIG. 10, current 712-1 includes a rising portion 1008 and a falling portion 1010, which correspond to high and low portions 1004 and 1006 of duty cycle 1002, respectively. In other words, rising portion 1008 corresponds to an on-time of high-side power transistor 806-1, and falling portion 1010 corresponds to an on-time of low-side power transistor 808-1.

Times 1012 and 1014 correspond to midpoints of rising portions of phase current 712-1.

Times 1016 and 1018 correspond to mid-points of rising portions of phase current 712-2.

A time 1020 corresponds to a mid-point of a rising portion of phase current 712-3.

Times 1022 and 1024 correspond to midpoints of rising portions of phase current 712-4.

A signal 1026 may correspond to a sum of phase currents 712-1 through 712-4.

A comparison operation is now described for phase current 712-1 with respect to a set of signals 1028 in FIG. 10.

Signals 1028 include an instantaneous per-phase average 1030 of phase currents 712-1 through 712-N, which may correspond to instantaneous per-phase average voltage 106 in FIG. 7.

Signals 1028 further include a signal 1032, which may correspond to a reduced version of per-phase average 1030, and which may correspond to reduced reference voltage 110 in FIG. 7.

Points 1034 may correspond to mid-points between signals 1030 and 1032.

Signals 1028 further include a signal 1036, which may correspond to a reduced version of phase current 712-1, and which may correspond to reduced input voltage 114 in FIG. 7.

Figure 11:
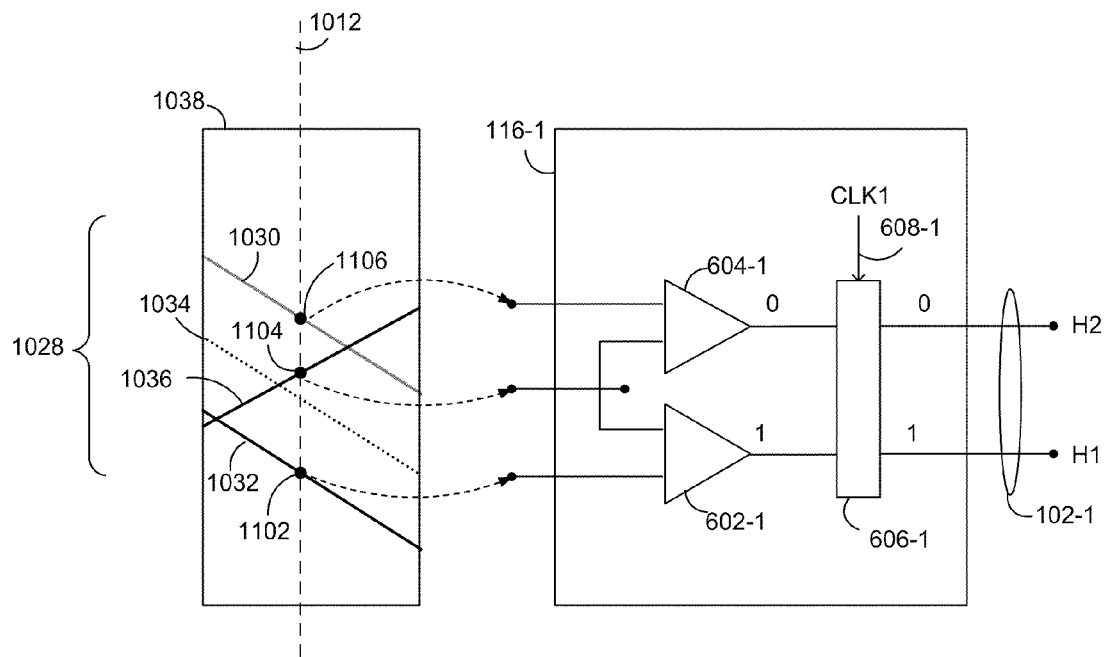
FIG. 11 is a graphic depiction of a portion of the timing diagram of FIG. 10 and a comparator system of FIG. 7.

The comparison operation is now described with respect to a portion 1038 in FIG. 10, and with reference to FIG. 11.

FIG. 11 is a graphic depiction of portion 1038 of FIG. 10, and comparator system 116-1 in FIG. 7.

As an analog device, comparator 602-1 continuously receives and compares signals 1032 and 1036, where signal 1032 represents a lower limit of a comparison range. Similarly, comparator 604-1 continuously receives and compares signals 1036 and 1030, where signal 1030 represents an upper limit of the comparison range. Outputs of comparators 602-1 and 604-2 represent an amplitude of signal 1036 relative to upper and lower limits defined by signals 1030 and 1032.

At time 1012, corresponding to a mid-point of signal 1036, points 1002 and 1004 of signals 1032 and 1036, respectively, are present at the inputs of comparator 602-1, and points 1104 and 1106 of signals 1036 and 1030, respectively, are present at the inputs of comparator 604-1. In the example of FIG. 11, point 1104 corresponds to a higher voltage than point 1102, and the output of comparator 602 is a relatively high level. Point 1104 corresponds to a lower voltage than point 1106, and the output of comparator 604 is a relatively low level.

Also at time 1012, clock 608-1 controls latch 606-1 to latch the relatively high output of comparator 604 as logic 1, and to latch the relatively low output of comparator 602 as logic 0. In FIG. 4, this corresponds to H1=1 and H2=2. In accordance with FIGS. 4 and 5, this corresponds to an indication that current 712-1 is within an acceptable range of instantaneous per-phase average 1030.

At steady state, the latched or instantaneous midpoint value 1104 of phase current 712-1 at time 1012 represents an average value of phase current 712-1 over the corresponding duty cycle. Even during transients, midpoint value 1104 provides reasonably accurate information. Midpoint sampling may thus be employed, without filtering of input signals 104, which may improve transient response.

Figure 12:
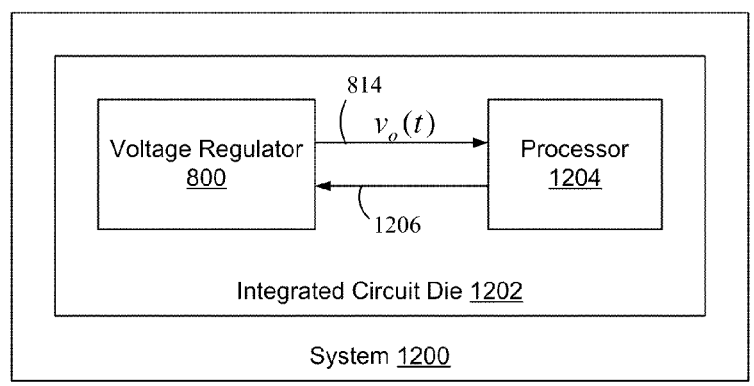
FIG. 12 is a block diagram of system, including an integrated circuit die having a processor and a voltage regulator fabricated thereon.

FIG. 12 is a block diagram of system 1200, including an integrated circuit die 1202 having voltage regulator 800 and a corresponding load, illustrated here as a processor 1204, fabricated thereon.

Voltage regulator 800 may provide output voltage $v_o(t)$ 814 to processor 1204.

Processor 1204 may provide information and/or commands 1206 to voltage regulator 800, which may include an indication of a voltage requirement of processor 1204. For example, processor 1204 may be configured to operate at multiple power levels, which may correspond to multiple performance levels. Information and/or commands 1206 may be provided to, for example, VID code $v_{VID}[k]$ 844 in FIG. 8, to adjust output voltage $v_o(t)$ 814 accordingly.

System 700 in FIG. 7 utilizes an averaging system 702, containing resistors, controllable switches, and a follower, to continuously determine an instantaneous per-phase average 106 in FIG. 7. If a step load is experienced by output voltage $v_o(t)$ 814 in FIG. 8, per-phase average 106 in FIG. 7 is updated substantially instantaneously. Total current $i_{tot}[k]$ 718 is updated upon a subsequent sample cycle of ADC 716, and $i_{tot}[k]$ 718 is updated substantially immediately thereafter. Total current indication $i_{tot}[k]$ 718 thus represents an instantaneous, or nearly instantaneous total of phase currents 712-1 through 712-N.

In FIG. 7, as an example, N may be equal to 8, ADC 716 may include 32 comparators to provide 5 bits of resolution, and comparator systems 116-1 through 116-8 may include N×2=16 comparators, for a system total of 48 comparators.

In contrast, an 8 phase voltage regulator having per-phase ADCs configured to provide 5 bits of resolution may include N×2⁵=8×32=256 comparators.

In this example, system 700 utilizes 208 fewer comparators. At approximately 500 µA per comparator, this translates to approximately 100 mA. Averaging system 702 in FIG. 7 may consume less than 10% of the power and area of 208 avoided comparators.

Methods are disclosed below, which may be described with reference to one or more examples above. The methods disclosed below are not, however, limited to the examples above.

Figure 13:
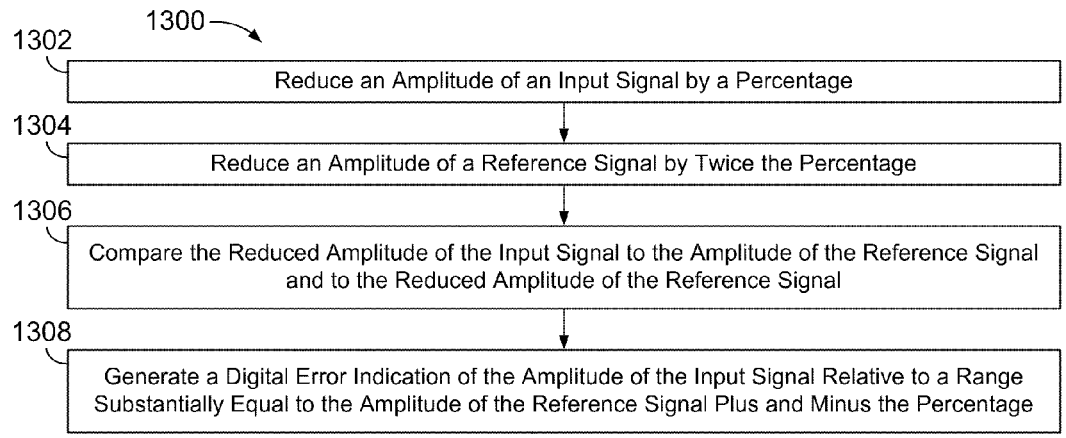
FIG. 13 is a flowchart of a method of generating a digital error indication of an amplitude of an input signal relative to a range substantially equal to an amplitude of a reference signal plus and minus a percentage.

FIG. 13 is a flowchart of a method 1300 of generating a digital error indication of an amplitude of an input signal relative to a range substantially equal to an amplitude of a reference signal plus and minus a percentage.

At 1302, an amplitude of an input signal is reduced by a percentage. The input signal may correspond to input signal 104 in FIG. 1. The amplitude of the input signal may correspond to a voltage level.

At 1304, an amplitude of a reference signal is reduced by twice the percentage. The reference signal may correspond to reference signal 106 in FIG. 1. The amplitude of the reference signal may correspond to a voltage level.

At 1306, the reduced amplitude of the input signal is compared to the amplitude of the reference signal and to the reduced amplitude of the reference signal. The comparing may be performed with comparator system 116 in FIG. 1.

At 1308, a digital error indication is generated, representative of the amplitude of the input signal relative to a range substantially equal to the amplitude of the reference signal plus and minus the percentage. The digital error indication may correspond to digital error indication 102 in FIG. 1.

Figure 14:
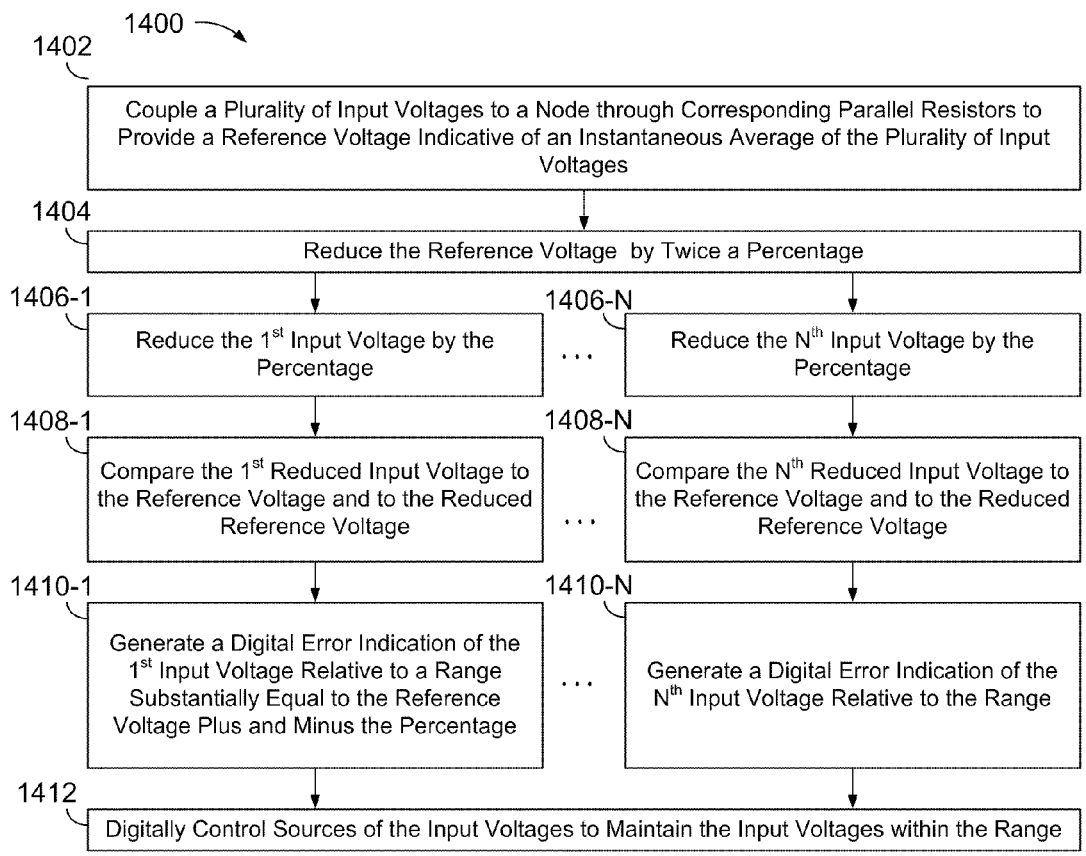
FIG. 14 is a flowchart of a method of generating digital error indications for each of a plurality of input voltages relative to a range substantially equal to an instantaneous average of the plurality of input voltages plus and minus a percentage.

FIG. 14 is a flowchart of a method 1400 of generating a digital error indication for each of a plurality of input voltages relative to a range substantially equal to an instantaneous average of the plurality of input voltages plus and minus a percentage.

At 1402, a plurality of input voltages are coupled to a node through corresponding parallel resistors to provide a reference voltage indicative of an instantaneous average of the input voltages. The input voltages may correspond to input voltages 104-1 through 104-N in FIG. 7, the parallel resistors may correspond to averaging network 704 in FIG. 4, and the node may correspond to node 707 in FIG. 7.

The coupling at 1402 may include selectively coupling active ones of the input voltages, such as described above with respect to selector 706 in FIG. 7.

At 1404, the instantaneous average of the input voltages is reduced by twice a percentage, such as described above with respect to voltage reducer 108 in FIG. 7.

At 1406-1 through 1406-N, each of the input voltages is reduced by the percentage, such as described above with respect to voltage reducers 112-1 through 112-N in FIG. 7.

At 1408-1 through 1408-N, each of the reduced input voltages is compared to the instantaneous average of the input voltages and to the reduced instantaneous average of the input voltages, such as described above with respect to comparator systems 116-1 through 116-N in FIG. 7.

At 1410-1 through 1410-N, a digital error indication is generated for each of the input voltages relative to a range substantially equal to the instantaneous average of the input voltages plus and minus the percentage, such as described above with respect to latches 606-1 through 606-N in FIG. 7.

Figure 15:
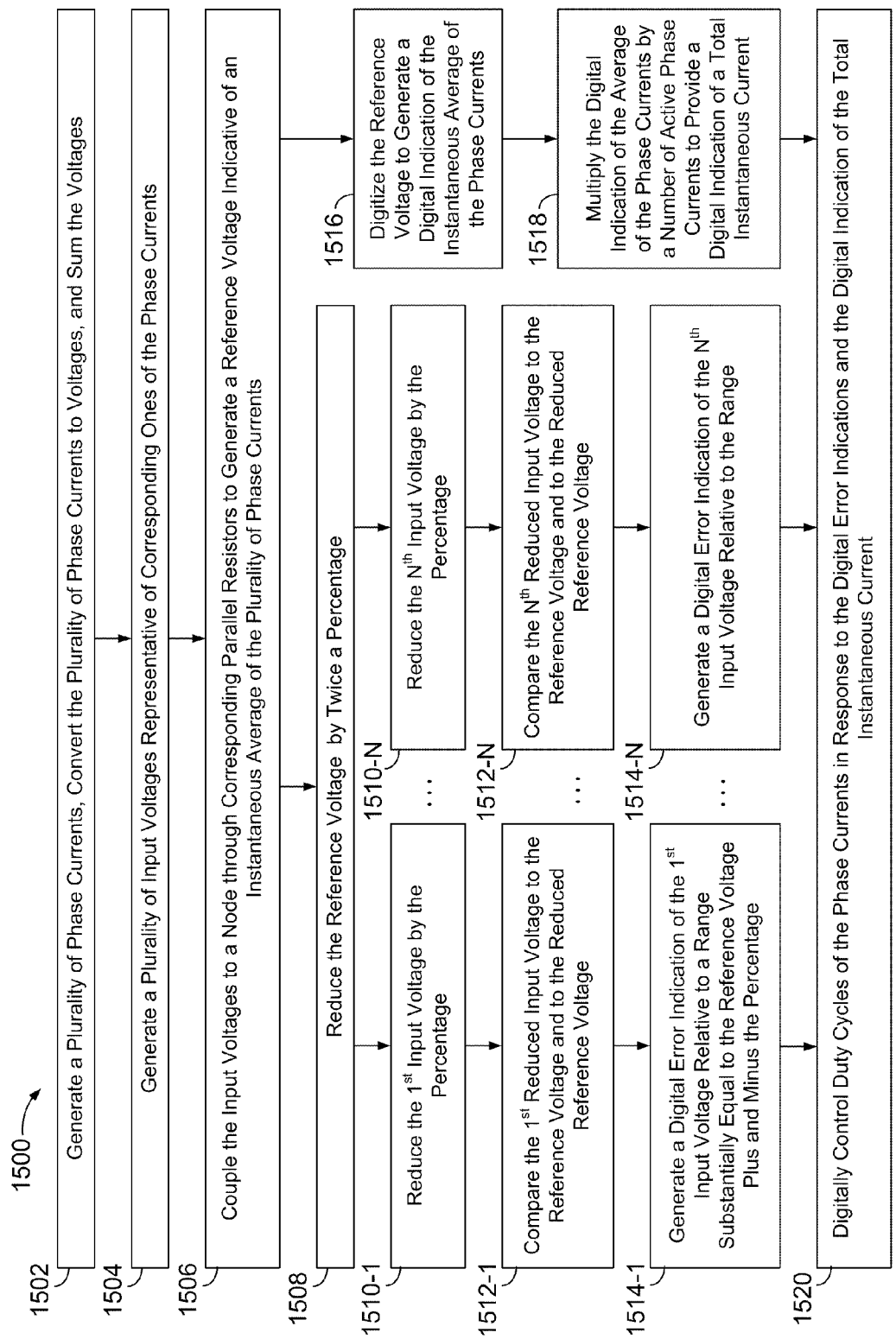
FIG. 15 is a flowchart of a method of generating digital error indications corresponding to phase currents of a multi-phase voltage regulator, and of digitally controlling duty cycles of corresponding transistors in response to the digital error indications and in response to a digital indication of an instantaneous total current.

FIG. 15 is a flowchart of a method 1500 of generating digital error indications corresponding to phase currents of a multi-phase voltage regulator, and of digitally controlling duty cycles of corresponding transistors in response to the digital error indications and in response to a digital indication of an instantaneous total current.

At 1502, a plurality of phase currents are generated and converted to voltages, and the voltages are summed to generate an output voltage, such as described above with respect to multi-phase voltage regulator 802 in FIG. 8.

At 1504, a plurality of input voltages are generated representative of corresponding ones of the phase currents, such as described above with respect to current sensors 710-1 through 710-N in FIG. 7.

At 1506, a reference voltage is generated indicative of an instantaneous average of the phase currents, such as described above with respect to 1402 in FIG. 14.

At 1508 through 1514, a digital error indication is generated for each of the phase currents relative to a range substantially equal to the reference voltage plus and minus the percentage, such as described above with respect to 1404 through 1410 in FIG. 13.

At 1516, the reference voltage is digitized to generate a digital indication of the instantaneous average of the phase currents, such as described above with respect to $i_{avg}[k]$, 714 in FIG. 7.

At 1518, the digital indication of the instantaneous average phase current is multiplied by a number of active phase currents to generate a digital indication of a total instantaneous phase current, such as described above with respect to $i_{tot}[k]$, 718 in FIG. 7.

At 1520, duty cycles of transistors are digitally controlled in response to the digital error indications and in response to the digital indication of the total instantaneous phase current, such as described above with respect to system level duty cycle control module 830 and per-phase duty cycle control module 832 in FIG. 8.

One or more features disclosed herein may be implemented alone and/or in various combinations with one another.

One or more features disclosed herein may be implemented in one or more of discrete circuitry and integrated circuitry, including application specific integrated circuitry (ASIC), and may be implemented as part of a domain-specific integrated circuit package and/or a combination of integrated circuit packages.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. A system, comprising:
a first resistor divider to reduce an input voltage by a first amount;
a second resistor divider to reduce a reference voltage by second amount that is greater than the first amount; and
a comparator system to receive the reduced input voltage, the reference voltage, and the reduced reference voltage, and to output a digital error indication of the reduced input voltage relative to a first range defined by the reference voltage and the reduced reference voltage, wherein the digital error indication is representative of an error of the input voltage relative to a second range centered substantially about the reference voltage,
wherein the system further includes
a plurality of additional first resistor dividers, each to reduce a corresponding additional input voltage,
a parallel resistor network to receive the input voltages and to output an instantaneous average of the input voltages as the reference voltage, and
a plurality of additional comparator systems, each to receive a corresponding one of the additional reduced input voltages, the reference voltage, and the reduced reference voltage, and to output a corresponding digital error indication.

2. The system of claim 1, wherein the first resistor divider is configured to reduce the input voltage by a percentage and the second resistor divider is configured to reduce the reference voltage by two times the percentage, and wherein the second range is substantially equal to the reference voltage plus and minus the percentage.

3. The system of claim 1, wherein the digital error indication corresponds to the reduced input voltage being one of, below the first range, within the first range, and above the first range.

4. The system of claim 1, further including:
a plurality of switches, each to selectively couple one of the input voltages to the parallel resistor network when a source of the input voltage is active.

5. The system of claim 1, further including:
a digitally controlled voltage regulator including transistors to generate a plurality of phase currents to control an output voltage;
a plurality of current sensors, each to generate a corresponding one of the input voltages representative of one of the phase currents, wherein the instantaneous average of the input voltages represents an instantaneous average of the phase currents; and
a digital controller to control duty cycles of the transistors in response to the digital error indications.

6. The system of claim 5, further including:
an analog to digital converter to convert the instantaneous average of the phase currents to a digital indication; and
a digital multiplier to multiply the digital indication of the instantaneous average of the phase currents by a number of active ones of the phase currents to generate a digital indication of an instantaneous total current;
wherein the digital controller is configured to control duty cycles of the transistors in response to the digital error indications and the digital indication of the instantaneous total current.

7. The system of claim 5, wherein the digital controller includes a phase current balance system to control duty cycles of the transistors to substantially balance the phase currents with respect to one another, and wherein the phase current balance system includes a plurality of per-phase duty cycle modules, each including:
a gain module, including one or more of a multiplier and a look-up table, to output a gain value in response to a corresponding one of the digital error indications; and
in integrator to integrate outputs of the gain module over time.

8. The system of claim 5, wherein each of the comparator systems includes:
a first comparator to compare the reduced input voltage to the reference voltage;
a second comparator to compare the reduced input voltage to the reduced reference voltage; and
a latch to sample outputs of the first and second comparators substantially at a midpoint of an on-time of a corresponding one of the transistors.

9. A system, comprising:
an integrated circuit die including a processor and a digitally controlled voltage regulator, wherein the digitally controlled voltage regulator includes,
a plurality of transistors to generate phase currents to provide an output voltage to the processor,
a phase current error sensor system to receive analog input voltages representative of the phase currents and to output digital indications of errors between each of the phase currents and an average of the phase currents, wherein the digital error indications include an indication that a phase current is within a range of the average of the phase currents, an indication that a phase current is below the range, and an indication that a phase current is above the range, and a digital controller to control the duty cycles of the transistors in response to the digital error indications.

10. The system of claim 9, wherein the phase current error sensor system includes:

a plurality of first resistor dividers, each to reduce a corresponding one of the input voltages;

a parallel resistor network to receive the input voltages and to output an instantaneous average of the input voltages as a reference voltage, wherein the reference voltage is representative of the average of the phase currents;

a second resistor divider to reduce the reference voltage; and a plurality of comparator systems, each to generate a corresponding one of the digital error indications from the reference voltage, the reduced reference voltage, and a corresponding one of the reduced input voltages.

11. The system of claim 10, wherein each of the comparator systems includes:

a first comparator to compare the reduced input voltage to the reference voltage;

a second comparator to compare the reduced input voltage to the reduced reference voltage; and a latch to sample outputs of the first and second comparators substantially at a midpoint of an on-time of a corresponding one of the transistors.

12. The system of claim 10, further including:

a plurality of switches, each to selectively couple one of the input voltages to the parallel resistor network when a source of the corresponding input voltage is active.

13. The system of claim 10, further including:

an analog to digital converter to convert the instantaneous average of the input voltages to a digital indication of the instantaneous the average of the phase currents; and a digital multiplier to multiply the digital indication of the instantaneous average of the phase currents by a number of active ones of the phase currents to generate a digital indication of an instantaneous total current;

wherein the digital controller is configured to control the duty cycles of the transistors in response to the digital error indications and the digital indication of the instantaneous total current.

14. The system of claim 9, wherein the digital controller includes a plurality of per-phase duty cycle modules, each including a gain module to receive a corresponding one of the digital error indications and an integrator to integrate outputs of the gain module over time, wherein each of the gain modules is configured to, output a value of one when the digital error indication indicates that the corresponding phase current is within the range, output a negative value of a gain factor when the digital error indication indicates that the corresponding phase current is above the range, and output a positive value of the gain factor when the digital error indication indicates that the corresponding phase current is below the range.

15. The system of claim 14, wherein each of the gain modules includes a multiplier to multiply a decoded value of the digital error indication by the gain factor.

16. The system of claim 14, wherein the gain module is configured to look-up an output value in response to the digital error indication.

17. A method, comprising:

reducing an amplitude of an input signal by a first amount; and reducing an amplitude of a reference signal by a second amount that is greater than the first amount;

comparing the reduced amplitude of the input signal to the amplitude of the reference signal and to the reduced amplitude of the reference signal; and generating a digital error indication of the amplitude of the input signal relative to a first range defined by the amplitude of the reference signal and the reduced amplitude of the reference signal, wherein the digital error indication is representative of an error of the amplitude of the input signal relative to a second range centered substantially about the amplitude of the reference signal;

wherein the reducing of the amplitudes, the comparing, and the outputting are performed with a combination of resistors, comparators, and latches.

18. The method of claim 17, further including:

digitally controlling a plurality of transistors to generate a plurality of phase currents to control an output voltage;

generating the input signal and a plurality additional input signals as voltages representative of corresponding ones of the phase currents;

generating the reference signal as an instantaneous average of the voltages of the input signals, and representative of an instantaneous average of the phase currents; and generating an additional digital error indication for each of the additional input signals;

wherein the digitally controlling includes digitally controlling duty cycles of the transistors in response to corresponding ones of the digital error indications.

19. The method of claim 18, wherein the generating of the digital error indications includes, for each phase current:

comparing the reduced amplitude of the input signal to the amplitude of the reference signal;

comparing the reduced amplitude of the input signal to the reduced amplitude reference signal; and latching results of the comparisons substantially at a midpoint of a rising portion of the phase current.

* * * * *